W. M. PARHAM.
VEHICLE WHEEL.
APPLICATION FILED AUG. 1, 1918.
1,349,730.
Patented Aug. 17, 1920.
2 SHEETS—SHEET 2.
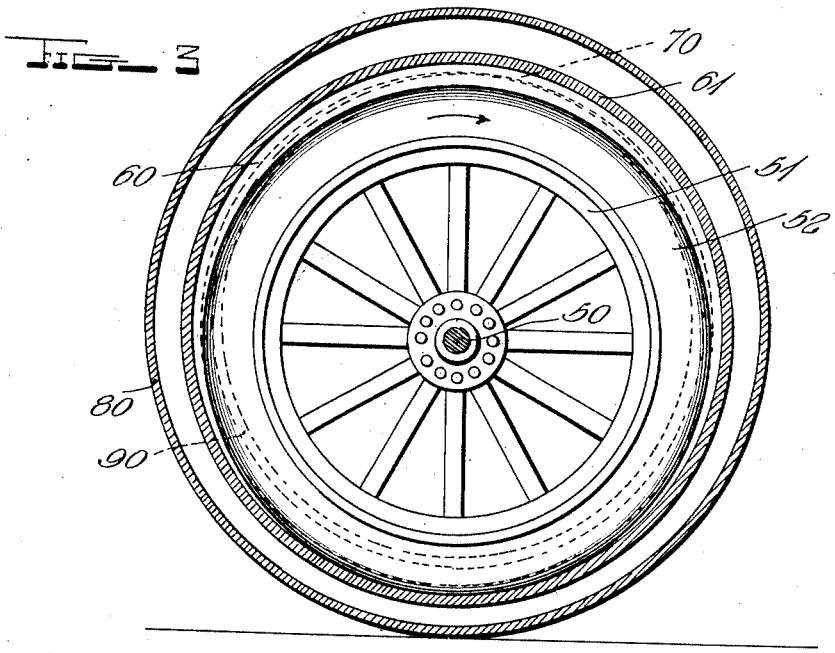
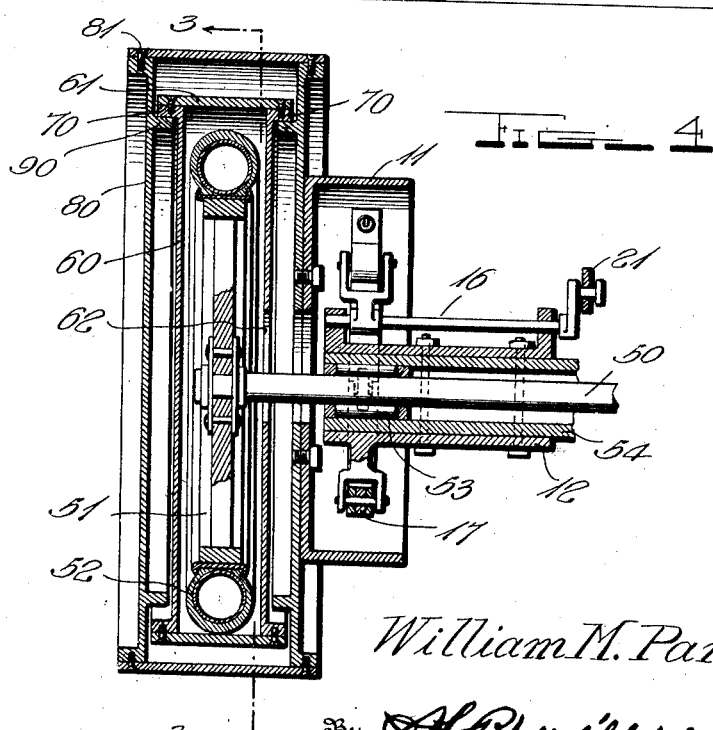
Inventor
William M. Parham
By H. B. Willson &co.
Attorneys

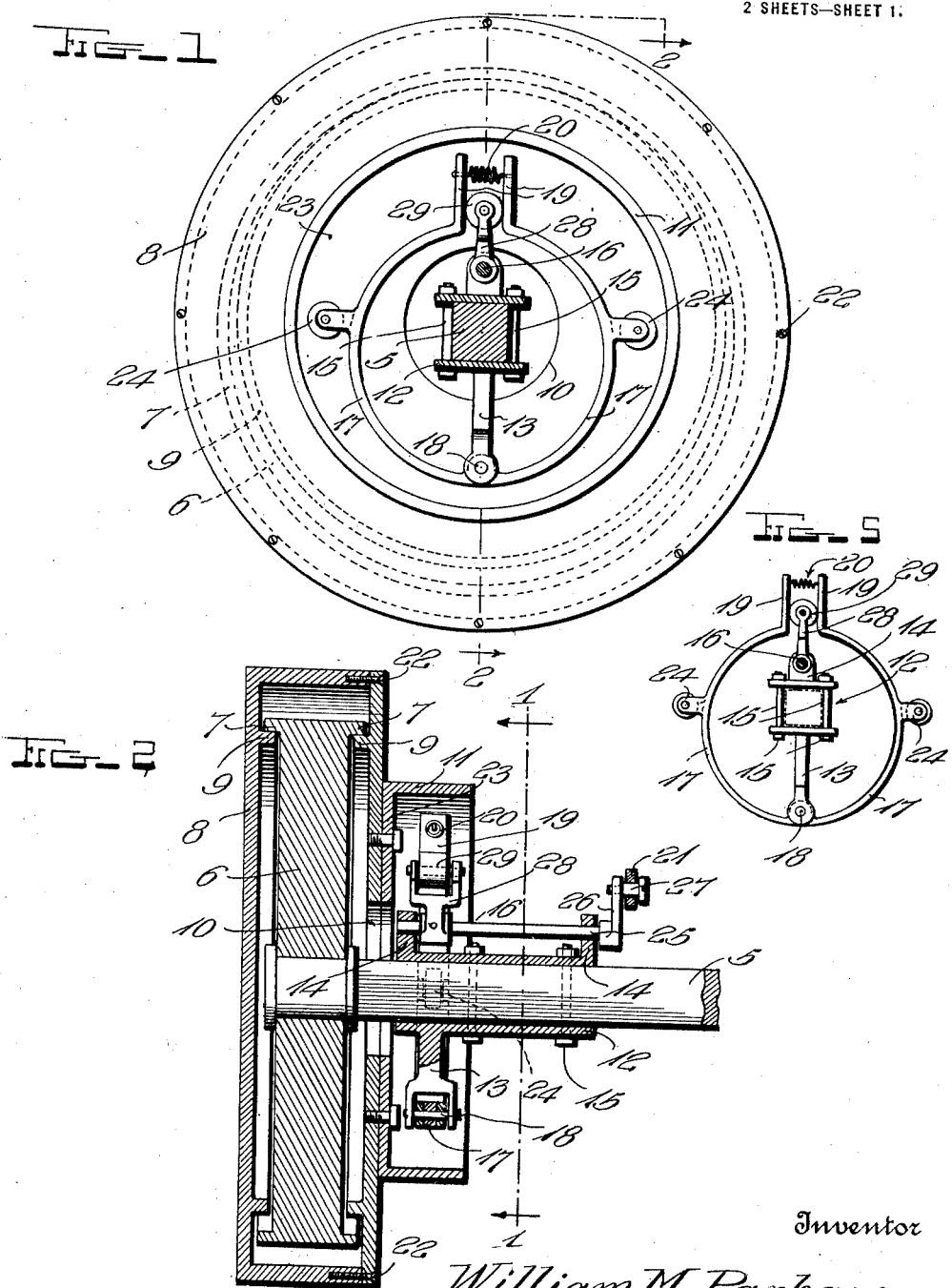

UNITED STATES PATENT OFFICE.

WILLIAM M. PARHAM, OF SPRING HILL, TENNESSEE.

VEHICLE-WHEEL.

1,349,730.  Specification of Letters Patent.  Patented Aug. 17, 1920.

Application filed August 1, 1918. Serial No. 247,814.

*To all whom it may concern:*

Be it known that I, WILLIAM M. PARHAM, a citizen of the United States, residing at Spring Hill, in the county of Maury and State of Tennessee, have invented certain new and useful Improvements in Vehicle-Wheels; and I do declare the following to be a full, clear, and exact description of the invention, such as will enable others skilled in the art to which it appertains to make and use the same.

This invention relates to vehicle wheels and it relates more specifically to an improved compound wheel and its adjuncts.

One object of this invention is to provide an improved wheel-controlling device which is reversely operable to both facilitate and retard the progress of the wheel temporarily while rolling over a chock in front or rear of the wheel.

A further object is to provide a triplex wheel construction, in which a pneumatic tire is incased so as to be guarded against puncturing and to retain its function of cushioning the shocks received thereby;

A further object is to provide a device of this character which is applicable to wagons, automobiles, railway rolling stock or other vehicles.

Further objects of the invention are to provide a device which will lessen the motive power required to propel the vehicle, which will reduce the liability of the wheel skidding, which will lessen the amount of dust raised by the contact of the wheel with the road and which will also lessen the injury to the road surface.

Other objects and advantages may become apparent to persons who read the following details of description in connection with the accompanying drawings, in which:

Figure 1 is a side elevation of a wheel and its controlling mechanism constructed in accordance with one form of my invention;

Fig. 2 is a central section view, the section being taken substantially along the line 2—2 of Fig. 1;

Fig. 3 is a section along the line 3—3 of Fig. 4, this figure illustrating a modified form of my invention;

Fig. 4 is a central sectional view through this modified form of the invention, the section being taken at right angles to that of Fig. 3, and Fig. 5 is a detail view.

Referring to these drawings in detail, in which similar reference characters correspond with similar parts throughout the several views, the form illustrated in Figs. 1 and 2 comprises a stationary or non-rotary axle 5; a wheel 6 mounted to rotate on the end of the axle 5, and provided with a pair of peripheral flanges or shoulders 7; a hollow wheel 8 provided with a pair of annular flanges or shoulders 9 which are of less diameter than the flanges or shoulders 7, this wheel being of greater diameter than the wheel 6 and provided with a central opening 10 through which the axle 5 extends; an annulus 11 which is secured on the outer surface of the wheel 8 and is coaxial therewith; a supporting structure 12 which is secured to the axle 5 and comprises an arm 13, bearings 14 and securing bolts 15, the arm 13 being diametrically opposed to the bearings 14; a rocker 16; levers 17 pivotally mounted at 18 on the arm 13, these levers having parallel spaced ends 19; a spring 20 which constantly tends to draw the arms 19 together; and an actuating element 21 which is pivotally connected to the rocker 16, and may be connected to a hand-lever (not shown) or to any suitable means by which it is operable to rock and hold the rocker 16.

The wheel 8 may be of any appropriate construction, that is, it may be formed of any desired material or materials, and may, if desired, be provided with a cushion or pneumatic tire around its periphery. This wheel is, however, preferably formed of two parts, as shown in Fig. 2, and connected by screws or other securing means, as illustrated at 22. The annulus 11 may be provided with a radial flange 23 which is secured to the wheel 8 by screws or bolts, as illustrated, or by other appropriate means.

Each of the levers 17 is curved outward around the axle 5, and is provided with a lateral extension 24 which may comprise a bearing and an anti-friction roller, as disclosed in Fig. 1, and these lateral extensions are movable into contact with the annulus 11 by means of the rocker 16. This rocker, as disclosed in the present embodiment of my invention, comprises a shaft 25, an arm or crank 26, a crank pin 27, an arm 28 and a wheel or roller 29, the latter being journaled on the arm 28 and embraced between the substantially parallel ends 19 of the lever 17. It will be seen, therefore, that when the actuating element 21 is moved in any direction, it rocks the rocker 16 in a corresponding direction, thereby swinging the lever 17 forward or rearward, so that either the front or rear extension 24 contacts with the inner surface of the annulus 11; and that by continuing such movement, the shaft 5 is shifted forward or rearward with relation to the annulus and the wheel 8 to which the annulus is fixed. In thus shifting the axle 5, the wheel 6 is shifted accordingly, and the point of contact between the shoulders 7 and 9 is shifted either forward or rearward beyond the line 2—2 (see Fig. 1), according to the direction in which the actuating member 21 has been moved.

When the device is standing still, it may be assumed that the several correlated elements of this device are in the position indicated in Fig. 1 with relation to one another, and that it is desired to force the vehicle-wheel to move toward the right. In this event, the actuator 21 would be moved in the direction for swinging the arm 28 toward the left until the left-hand lever 17 moves its extension 24 against the annulus 11, and a continuation of this movement causes the axle 5 to move forward or rightward with relation to the annulus 11 and wheel 8. This relative movement of the wheels 6 and 8 shifts their contact point from the line 2—2 to a point leftward of this line, the distance which the contact point is shifted being commensurate with the distance which the actuating member 21 is moved. Now, by way of illustration assume that this contact point has been thus shifted leftward or rearward slightly, say 5° to 15° from the line 2—2 and secured in this position it will be seen that the wheel 6 now exerts a forward pressure and then when the propelling force is applied to axle 5, this produces a pulling downward pressure against the annular shoulder 9 of the wheel 8, and this pressure facilitates the forward movement of the ground-wheel 8. Now, suppose, for instance, that the ground-wheel is obstructed or impeded by an immovable obstruction in front thereof, such as a ledge of rock, a railroad track, etc.: It will be seen that by shifting the contact point of the shoulders 7 and 9 rearward, the added impetus thereby gained would materially assist the motive power in overcoming this obstruction. On the other hand, it may be assumed that it is desired to back the vehicle which comprises wheels of this character, and it is obviously only necessary to reverse the movement of the actuating member 21 and secure it in the desired reversed position, so as to overcome an obstruction behind the wheel.

The foregoing principle is applicable in connection with vehicles having rotary axles, as disclosed in Figs. 3 and 4, in which 50 designates a rotary axle which is carried by an automobile wheel 51 of ordinary construction and comprises a pneumatic tire 52. The wheel 51 is attached to axle 50, and the latter is rotatable in relief bearings 53 which are disposed within a non-rotary hollow shaft 54. Upon this hollow shaft is disposed the supporting structure 12 which carries the rocker 16 and the levers 17. The mechanism carried by the hollow shaft 54 may be identical with the mechanism previously described as being carried by the shaft 5, except that the hollow shaft 54 carries the rotary shaft 50, and does not carry a wheel 6. In this modified form, a wheel 60 replaces the wheel 6, said wheel 60 being provided with annular peripheral flanges or shoulders 70 and with an annular or cylindrical track member 61, on the inner surface of which the wheel 51 rolls, an aperture 62 being provided for the shaft 50 to extend outward therethrough, this aperture being of much greater diameter than the shaft 50. The ground wheel in this modified form is indicated by the numeral 80 and is provided with annular flanges or shoulders 90 which correspond with the shoulders 9 of Figs. 1 and 2 and these annular shoulders 90 are of less diameter than these annular shoulders 70, and normally support the latter at points in the vertical axial plane of the ground-wheel. The wheel 80 may be formed of several parts as indicated in Fig. 4, these parts being united by means indicated at 81. The annulus 11 may be identical in shape and position with that previously described and coöperates with the rocker 16 and its adjuncts in the manner previously described with regard to Figs. 1 and 2. However, the operation of this modified form is somewhat different, because the axle 5 is stationary and the axle 50 is rotary. Therefore, as the wheel 51 rotates in the direction of the arrow in Fig. 3, its rotation imparts a rotary movement to the wheel 60, and this wheel, in turn, imparts a rotary motion to the wheel 80. When it is desired to effect the rotary movement of the wheels from a position of rest, the actuating element 21 is shifted so as to move the axles 54 and 50 forward with relation to the wheel 80. Obviously, since the wheel 51 is in engagement with the wheel 60 at its lowest point, a forward movement of the wheel 51 effects a forward movement of the lower part of the wheel 60, thereby changing and holding the contact points of the annular shoulders 70 and 90 to a point rearward of the vertical plane which coincides with the axis of the wheel 80; and this changing and holding of the contact point, or point of support of the wheel 60 and then when the propelling force of the axle is applied it forces the vehicle-wheel forward and thereby effects substantially the same result as described for the structure illustrated in Figs. 1 and 2.

What I claim as my invention is:

1. The combination in a vehicle supporting mechanism, of an axle, a wheel having a peripheral shoulder thereon, and a second wheel of greater diameter than the first said wheel and having an annular shoulder of less diameter than the said peripheral shoulder, the shoulder of greater diameter being supported on the shoulder of less diameter at a point of contact above said axle, a support on said axle, a rocker on said support, an arm on said support, a pair of levers pivotally mounted on said arm and extending on opposite sides of said axle, means connecting the free ends of said levers with said rocker in a relation to enable them to be actuated by the rocker, and means carried by the wheel of greater diameter and operable by said levers to shift said point of contact relative to the vertical plane that coincides with the axis of said wheel of greater diameter.

2. The combination in a vehicle supporting mechanism, of an axle, a wheel having a peripheral shoulder thereon, and a second wheel of greater diameter than the first said wheel and having an annular shoulder of less diameter than the said peripheral shoulder, the shoulder of greater diameter being supported on the shoulder of less diameter at a point of contact above said axle; a support on said axle, a rocker on said support, an arm on said support, a pair of levers pivotally mounted on said arm and extending on opposite sides of said axle, means connecting the free ends of said levers with said rocker in a relation to enable them to be actuated by the rocker, an annulus on said wheel of greater diameter, and laterally extending elements on said levers and movable thereby so as to coöperate with said annulus for shifting said point of contact forward and rearward beyond the plane that coincides with the axis of said wheel of greater diameter.

3. In combination, a wheel, an axle therefor, a supporting wheel of greater diameter than the first said wheel and supporting the latter on a contact point above said axle, an annulus on said supporting wheel, a supporting structure correlated with said wheels and axle, a pair of levers pivotally mounted on said supporting structure and having parallel spaced ends, a spring connecting said ends and tending to draw them together, a roller embraced by said parallel ends, a rock-shaft journaled in said supporting structure, an arm on said rock-shaft and carrying said roller, means to rock said rock-shaft, and rollers carried by said levers and movable thereby against the inner surface of said annulus so as to coöperate with the latter and thereby shift the said contact point forward and rearward according to the direction in which said means moves said rock-shaft.

4. In combination, a resilient tread wheel, a rotary axle secured thereto, a hollow wheel having a concaved cylindrical surface on which the first said wheel rolls, said hollow wheel having annular peripheral flanges, an outer hollow cylindrical wheel having annular shoulders of less external diameter than the internal diameter of said peripheral flanges, said flanges having their internal concaved surfaces supported on the convexed outer surfaces of said shoulders so that said hollow wheel is suspended within said outer cylindrical wheel, an annulus on the outer surface of said cylindrical wheel, a bearing in which said axle is mounted for rotation, a support on said bearing, a rocker on said support, a pair of levers pivotally connected to said support and extending on opposite sides of said axle and being inclosed by said annulus, and means yieldingly connecting the free ends of said levers to one another, said rockers having an element between said levers and being operable to press said levers against the front and rear inner surfaces of said annulus and thereby shift the supporting contact point of said shoulder and flange forward and rearward.

In testimony whereof I have hereunto set my hand.

WILLIAM M. PARHAM.